US012706305B2

(12) United States Patent
Nelson et al.

(10) Patent No.: US 12,706,305 B2
(45) Date of Patent: Aug. 11, 2026

(54) METHOD OF MAKING A CATHODE ACTIVE MATERIAL

(71) Applicant: Redwood Materials, Carson City, NV (US)

(72) Inventors: Alan Nelson, Carson City, NV (US); Yu-Hua Kao, Carson City, NV (US); Benjamin Malley, Carson City, NV (US); Fangfu Zhang, Carson City, NV (US); Edward Matios, Carson City, NV (US)

(73) Assignee: Redwood Materials, Carson City, NV (US)

( * ) Notice: Subject to any disclaimer, the term of this patent is extended or adjusted under 35 U.S.C. 154(b) by 701 days.

(21) Appl. No.: 18/107,633

(22) Filed: Feb. 9, 2023

(65) Prior Publication Data

US 2023/0268496 A1 Aug. 24, 2023

Related U.S. Application Data

(60) Provisional application No. 63/341,270, filed on May 12, 2022, provisional application No. 63/311,535, filed on Feb. 18, 2022.

(51) Int. Cl.
*H01M 4/505* (2010.01)
*C01G 53/50* (2025.01)
(Continued)

(52) U.S. Cl.
CPC ............ *H01M 4/505* (2013.01); *C01G 53/50* (2013.01); *H01M 4/525* (2013.01); (Continued)

(58) Field of Classification Search
CPC .................................................... H01M 4/505
See application file for complete search history.

(56) References Cited

U.S. PATENT DOCUMENTS 9,834,827 B2 * 12/2017 Wang .................... H01M 4/525
10,522,884 B2 12/2019 Wang et al.
(Continued)

FOREIGN PATENT DOCUMENTS

CN 109837392 A 6/2019
KR 20140066053 A 5/2014
(Continued)

OTHER PUBLICATIONS

International Search Report for the corresponding International Application No. PCT/US2023/012663, International Filing Date: Feb. 9, 2023; Date of Mailing: May 24, 2023; 3 pages.
(Continued)

*Primary Examiner* — William D Young
(74) *Attorney, Agent, or Firm* — Stites & Harbison, PLLC

(57) ABSTRACT

A method of making a cathode active material includes contacting a mixed metal composition with water to form a first solution. The mixed metal composition includes nickel, cobalt, manganese, aluminum, or a combination thereof, and greater than 0 to 2 weight percent, based on the total weight of the mixed metal composition, of a compound comprising Cu, Fe, Mg, Na, Ca, Zn, F, Si, Li, or a combination thereof. A salt of nickel, cobalt, manganese, aluminum, or a combination thereof is added to the first solution to provide a second solution, which can be further combined with a basic solution to provide a precipitate. The precipitate can be combined with a lithium compound and treated to provide the cathode active material.

18 Claims, 7 Drawing Sheets

(51) Int. Cl.
*H01M 4/02* (2006.01)
*H01M 4/525* (2010.01)

(52) U.S. Cl.
CPC ...... *C01P 2002/52* (2013.01); *C01P 2004/03* (2013.01); *C01P 2006/40* (2013.01); *H01M 2004/028* (2013.01)

(56) References Cited

U.S. PATENT DOCUMENTS

| | | | | |
|---|---|---|---|---|
| 11,127,992 | B2 | 9/2021 | Wang et al. | |
| 2021/0391606 | A1 * | 12/2021 | Wang | C01G 49/02 |

FOREIGN PATENT DOCUMENTS

| | | | |
|---|---|---|---|
| KR | 20170033787 | A | 3/2017 |
| KR | 20170073217 | A | 6/2017 |
| KR | 20190084616 | A | 7/2019 |
| WO | 2017091562 | A1 | 6/2017 |

OTHER PUBLICATIONS

Written Opinion for the corresponding International Application No. PCT/US2023/012663, International Filing Date: Feb. 9, 2023; Date of Mailing: May 24, 2023; 5 pages.

Zhao et al.:"Regeneration and reutilization of cathode materials from spent lithium-ion batteries": Chemical Engineering Journal: vol. 383: 2020: 123089: pp. 1-19.

* cited by examiner

METHOD OF MAKING A CATHODE ACTIVE MATERIAL

CROSS REFERENCE TO RELATED APPLICATIONS

This application claims priority to U.S. Provisional Patent Application No. 63/341,270, filed on May 12, 2022, and to U.S. Provisional Patent Application No. 63/311,535, filed on Feb. 18, 2022, in the United States Patent and Trademark Office, and all the benefits accruing therefrom under 35 U.S.C. § 119, the contents of both of which are incorporated by reference herein in their entirety.

BACKGROUND

Lithium-ion batteries have become a popular power source in various applications including consumer electronics and electric vehicles. Millions of cells have been produced. Nonetheless, there remains a continuing need for improved methods of recovering and repurposing spent batteries. It would be particularly advantageous to provide an improved method for preparing cathode active materials for new batteries from other than new feedstock.

SUMMARY

An aspect of the present disclosure is a method of making a cathode active material, the method comprising: contacting a mixed metal composition with water to form a first solution, the mixed metal composition comprising nickel, cobalt, manganese, aluminum, or a combination thereof; and greater than 0 to 2 weight percent, based on the total weight of the mixed metal composition, of a compound comprising Cu, Fe, Mg, Na, Ca, Zn, F, Si, Li, or a combination thereof; adding a salt of nickel, cobalt, manganese, aluminum, or a combination thereof to the first solution to provide a second solution; combining the second solution and a basic solution to form a precipitate; adding a lithium compound to the precipitate to form a mixture; and heat-treating the mixture to form the cathode active material.

Another aspect is a cathode active material comprising: a first layered $Li_xMO_2$ phase; and a second phase; wherein M is Ni, Co, Mn, Al, or a combination thereof and $0<x<1.4$; and the second phase is derived from a recycled feedstock.

Another aspect is cathode active material comprising: a first phase; and a second phase; wherein the first phase comprises a first domain of the formula $Li_2MnO_3$ and a second domain of the formula $LiMO_2$, wherein M is Ni, Co, Mn, Al, or a combination thereof; and the second phase is derived from a recycled feedstock.

Another aspect is a method of making a purified mixed metal composition, the method comprising: contacting a mixed metal composition comprising nickel, cobalt, manganese, aluminum, or a combination thereof; and greater than 0 to 2 weight percent, based on the total weight of the mixed metal composition, of Cu, Fe, Mg, Na, Ca, Zn, F, Si, Li, or a combination thereof; with water to form a first solution; adding a salt of nickel, cobalt, manganese, aluminum, or a combination thereof to the first solution to provide a second solution; combining the second solution and a basic solution to form a precipitate comprising the purified mixed metal composition.

Another aspect is a purified mixed metal composition comprising $Ni(OH)_2$, $Co(OH)_2$, and $Mn(OH)_2$, preferably in a molar ratio of greater than 0 to 1:greater than 0 to 1:greater than 0 to 1, preferably 1:0.125:0.125; and one or more of Cu, Fe, Mg, Na, Ca, Zn, Al, F, Si, Li, or a combination thereof.

The above described and other features are exemplified by the following figures and detailed description.

BRIEF DESCRIPTION OF THE DRAWINGS

The following figures represent exemplary embodiments.

DETAILED DESCRIPTION

Figure 1A:
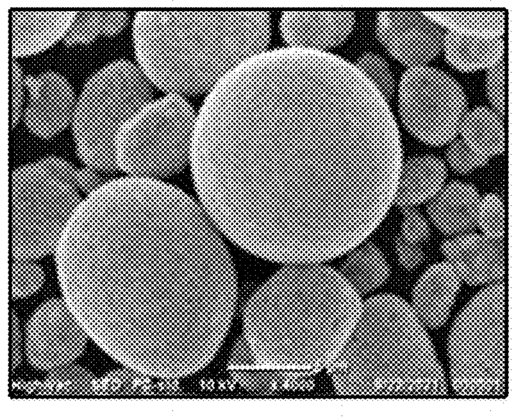
FIG. 1A shows scanning electron microscope (SEM) images of a precursor cathode active material prepared according to Comparative Example 1. The scale bar is 5 μm.

The present inventors have discovered a method for re-manufacturing batteries and battery materials, particularly cathode active materials and the precursors thereof. Cathode active materials prepared according to the methods described herein advantageously exhibited comparable or improved battery performance, despite utilizing high percentages of feedstock derived from exhausted batteries or battery manufacturing scrap. While not wanting to be bound by theory, it is believed that the cathode active materials prepared according to the methods described include a phase arising from the recycled feedstock resulting in the observed improved capacity.

Accordingly, an aspect of the present disclosure is a method of making a cathode active material from a mixed metal composition. In an aspect, the mixed metal composition comprises a mixed metal sulfate, a mixed metal nitrate, a mixed metal carbonate, a mixed metal halide, a mixed metal hydroxide, a mixed metal oxalate, or a combination thereof. In a specific aspect, the mixed metal composition comprises a mixed metal sulfate.

The mixed metal composition comprises nickel, cobalt, manganese, aluminum, or a combination thereof. For example, the mixed metal composition can preferably comprise nickel and cobalt. The mixed metal composition may further include greater than 0 to 2 weight percent, based on the total weight of the mixed metal composition, of a compound comprising Cu, Fe, Mg, Na, Ca, Zn, F, Si, Li, or a combination thereof. For example, the mixed metal composition can comprise greater than 0 to 1.5 weight percent, or greater than 0.0001 to 1 weight percent, or greater than 0.001 to 0.5 weight percent, or greater than 0 to 0.1 weight percent, or greater than 0 to 0.01 weight percent (100 ppm) of the compound comprising Cu, Fe, Mg, Na, Ca, Zn, F, Si, Li, or a combination thereof. In an aspect, the mixed metal composition can comprise greater than 0 to 1000 ppm, or greater than 0 to 750 ppm, or 5 to 750 ppm, or 5 to 1000 ppm, or 25 to 1000 ppm, or 25 to 750 ppm, or 50 to 750 ppm, or 100 to 750 ppm of the compound comprising Cu, Fe, Mg, Na, Ca, Zn, F, Si, Li, or a combination thereof. For example, the mixed metal composition can comprise 50 to 300 ppm Cu, 50 to 200 ppm of Al, 5 to 100 ppm of Fe, and 5 to 100 ppm of F, each based on the total weight of the mixed metal composition. In an aspect, the mixed metal composition can comprise lithium. When present, lithium can preferably be present in the mixed metal composition in an amount of 100 to 1000 ppm, based on the total weight of the mixed metal composition.

In an aspect, the mixed metal composition can comprise nickel and cobalt and greater than 0 to 2 weight percent, based on the total weight of the mixed metal composition, of Cu, Fe, Mg, F, Si, or a combination thereof.

The mixed metal composition can be obtained, for example, from exhausted lithium-ion batteries, lithium-ion battery production waste, and the like or a combination thereof. For example, a portion of, or an entirety of the mixed metal composition can be obtained from a recycled feedstock, preferably a post-industrial recycled feedstock, a post-consumer recycled feedstock, or a combination thereof. In an aspect, the Cu, Fe, Mg, Na, Ca, Zn, F, Si, Li, or a combination thereof of the compound comprising Cu, Fe, Mg, Na, Ca, Zn, F, Si, Li, or a combination thereof arises from a recycled feedstock, e.g., an exhausted battery or battery manufacturing scrap. The exhausted lithium-ion batteries (or any of the foregoing lithium-ion battery component sources) can be crushed, granulated, shredded, or the like, and subjected to a physical separation process to separate solid battery components (e.g., casings, electrodes, and the like) from volatile components, e.g., electrolyte solvents. Electrolyte salt (e.g., $LiPF_6$) can be removed by soaking in a suitable solvent (e.g., propylene carbonate), and the remaining undissolved materials (e.g., electrode materials, current collector) can be isolated, for example by filtration. Electrode particles can be separated from residual current collector, for example by contacting with a solvent suitable to dissolve the electrode particles, facilitating removal of the solid metal conductor components. The isolated electrode particles can be contacted with a leaching solution to extract elements such as Ni, Co, Mn, Al, Li, and Fe. Exemplary leaching solutions can include, but are not limited to, sulfuric acid (e.g., 2 to 5 M), optionally including hydrogen peroxide. The resulting solution can be centrifuged or filtered to remove any particulates and subjected to conditions effective to induce crystallization or precipitation of the desired mixed metal composition. For example, the filtered solution can be concentrated (e.g., in an evaporator) at 75 to 85° C., or 78 to 82° C., or 80° C. The concentrated solution can be cooled, e.g., to a temperature of less than 20° C., or 10 to 18° C., or 15° C. to crystallize the mixed metal composition.

The precipitated or recrystallized mixed metal composition can be isolated, for example using filtration, centrifugation, or the like, or a combination thereof. In an aspect, the mixed metal composition can be dewatered to a moisture content of 10% or less, for example, 1 to 10%, or 5 to 10%.

The mixed metal composition is contacted with water to form a first solution. The first solution can have a pH effective to dissolve the mixed metal composition, which can be selected by the skilled person without undue experimentation. In an aspect, the first solution can have pH of less than 7, for example less than 6.5. For example, when the mixed metal composition comprises a mixed metal hydroxide, an acidic pH can be preferred to ensure dissolution of the mixed metal hydroxide.

The method further comprises adding a salt of nickel, cobalt, manganese, aluminum, or a combination thereof to the first solution to provide a second solution. In an aspect, the foregoing salts can be virgin materials (i.e., not recovered or recycled from exhausted lithium-ion batteries). In an aspect, the salt of nickel, cobalt, manganese, aluminum, or a combination thereof is a sulfate or a hydroxide thereof (e.g., nickel sulfate, cobalt sulfate, manganese sulfate, aluminum sulfate, nickel hydroxide, cobalt hydroxide, manganese hydroxide, aluminum hydroxide, or a combination thereof). In an aspect, the salt comprises $NiSO_4$, $CoSO_4$, $MnSO_4$, $Al_2(SO_4)_3$, or a combination thereof.

The salt can be added in an amount effective to achieve a desired stoichiometry of the nickel, cobalt, manganese, aluminum, or combination thereof. For example, the salt of nickel, cobalt, and manganese can be added to the first solution in an amount effective to provide a molar ratio of Ni:Co:Mn of greater than 0 to 1:greater than 0 to 1:greater than 0 to 1, for example 0.1 to 1:0.1 to 1:0.1 to 1, or 0.7 to 0.9:0.05 to 0.15:0.05 to 0.15. In an aspect, the salt can be added to provide a molar ratio of Ni:Co:Mn of 6:2:2. In an aspect, the salt can be added to provide a molar ratio of Ni:Co:Mn of 8:1:1 (e.g., 1:0.125:0.125).

The mixed metal composition of the first solution (e.g., recovered or recycled from exhausted lithium-ion batteries or manufacturing scrap) can be contacted with the virgin salts in any amount to provide the stoichiometrically-adjusted mixed metal composition. In an aspect, the mixed metal composition (i.e., of the first solution) can account for 10 to 95 weight percent of the stoichiometrically-adjusted mixed metal composition of the second solution. Within this range, the mixed metal composition can account for 15 to 95 weight percent, or 20 to 95 weight percent, or 25 to 95 weight percent, or 30 to 90 weight percent of the stoichiometrically-adjusted mixed metal composition.

In an aspect, the salt comprises $NiSO_4$, $CoSO_4$, $Al_2(SO_4)_3$, or a combination thereof. In an aspect, the salt of nickel, cobalt, and aluminum can be added to the first solution in an amount effective to provide a molar ratio of Ni:Co:Al of greater than 0 to 1:greater than 0 to 1:greater than 0 to 1, for example 0.1 to 1:0.1 to 0.5:0.01 to 0.5, or 0.7 to 0.9:0.05 to 0.15:0.01 to 0.15. In an aspect, the salt can be added to provide a molar ratio of Ni:Co:Al of 0.8:0.15:0.05. In a specific aspect, the first solution can comprise Ni and Co, and salts comprising $NiSO_4$, $CoSO_4$, or a combination thereof can be added to provide the desired Ni:Co ratio. Separately, a first solution comprising Al can be provided, and $Al_2(SO_4)_3$ can be added. The first solution comprising the Ni and Co (after adjusting the stoichiometry) can be subsequently combined with the solution comprising the Al (after addition of the $Al_2(SO_4)_3$) to provide the stoichiometrically-adjusted mixed metal composition comprising Ni, Co, and Al.

In an aspect, the salt comprises $NiSO_4$, $MnSO_4$, $CoSO_4$, $Al_2(SO_4)_3$, or a combination thereof. In an aspect, the salt of nickel, cobalt, aluminum, and manganese can be added to the first solution in an amount effective to provide a molar ratio of Ni:Mn:Co:Al of greater than 0 to 1:greater than 0 to 1:greater than 0 to 1:greater than 0 to 1, for example 0.1 to 1:0.1 to 0.5:0.1 to 0.5:0.01 to 0.5, or 0.7 to 0.9:0.05 to 0.15:0.05 to 0.15:0.01 to 0.15. In an aspect, the salt can be added to provide a molar ratio of Ni:Mn:Co:Al of 0.8:0.05:0.05:0.1.

The second solution can have a pH that is the same or different from the pH of the first solution. In an aspect, the pH of the second solution can be less than 7, or less than 6.5. As described above, the salt is added to achieve a desired stoichiometry of the nickel, cobalt, manganese, aluminum, or combination thereof of the mixed metal composition of the second solution.

In addition to the stoichiometrically-adjusted mixed metal composition, the second solution can further comprise 0.0001 to 2 weight percent, based on the total weight of the stoichiometrically-adjusted mixed metal composition, of Cu, Fe, Mg, Na, Ca, Zn, F, Si, Li, or a combination thereof. Stated another way, the foregoing compositional components of the mixed metal composition (e.g., Cu, Fe, Mg, Na, Ca, Zn, F, Si, Li, or a combination thereof) have not been removed, and thus remain present in the second solution. It is noted that these compositional components are not added to the either the first solution or the second solution. Rather they are present at the outset of the method, arising from the mixed metal feedstock, e.g., from the recycled batteries or battery scrap, used in the method of the present disclosure.

The method further comprises combining the second solution with a basic solution to form a precipitate. In an aspect, the basic solution can be added to the second solution. In an aspect, the second solution is preferably added to the basic solution to form the precipitate. The basic solution is combined with the second solution in amount effective to maintain or provide a pH of greater than or equal to 10, preferably 10-13, more preferably 11-12. In an aspect, no precipitate is generated or separated from the second solution at a pH of less than 10. In an aspect, the combination of the basic solution and the second solution can be with agitation, for example at a speed of 500-1500 RPM at a temperature of 25 to 90° C.

The basic solution is preferably an aqueous basic solution and therefore can comprise a suitable base in water. The base can comprise, for example, an alkali metal hydroxide, ammonia, or a combination thereof. In an aspect, the basic solution comprises the alkali metal hydroxide (e.g., sodium hydroxide) and ammonia. When used in combination, a molar ratio of alkali metal hydroxide to ammonia can be, for example, 2:1 to 1:2, 3:2 to 2:3, 1.04:1 to 1:1.04, preferably 1.01:1 to 1:1.01. In a specific aspect, the molar ratio of alkali metal hydroxide to ammonia can be 1:1.

Combination of the basic solution and the second solution can coprecipitate a purified mixed metal composition having the desired ratio of, for example, Ni, Co, and Mn, referred to herein as a "precipitate" for simplicity. For example, the precipitate can comprise $Ni(OH)_2$, $Co(OH)_2$, and $Mn(OH)_2$, preferably in a molar ratio of greater than 0 to 1:greater than 0 to 1:greater than 0 to 1, preferably 6:2:2, 8:1:1 (1:0.125:0.125), or 9:0.5:0.5. The material precipitate can further include 5 to 100 ppm Li, for example 10 to 25 ppm Li, based on the total weight of the precipitate.

In an aspect, combination of the basic solution and the second solution can coprecipitate a precursor cathode active material having the desired ratio of, for example, Ni, Co, and Al. For example, the precipitate can comprise $Ni(OH)_2$, $Co(OH)_2$, and $Al(OH)_3$, preferably in a molar ratio of greater than 0 to 1:greater than 0 to 1:greater than 0 to 1, preferably 6:2:2, 8:1:1 (1:0.125:0.125), or 9:0.5:0.5. The precipitate can further include 5 to 100 ppm Li, for example 10 to 25 ppm Li, based on the total weight of the precipitate.

In an aspect, combination of the basic solution and the second solution can coprecipitate a purified mixed metal composition having the desired ratio of, for example, Ni, Mn, Co, and Al. For example, the precipitate can comprise $Ni(OH)_2$, $Mn(OH)_2$, $Co(OH)_2$, and $Al(OH)_3$, preferably in a molar ratio of greater than 0 to 1:greater than 0 to 1:greater than 0 to 1:greater than 0 to 1. The precipitate can further include 5 to 100 ppm Li, for example 10 to 25 ppm Li, based on the total weight of the precipitate.

Optionally, a chelating agent can be added to the second solution. When a chelating agent is added, it can be added to the second solution before, during or after addition of the basic solution. Exemplary chelating agents can include, but are not limited to, 5-sulfosalicylic acid. When present, the chelating agent can be added in an amount effective to provide a concentration of 0.1 to 10 M in the second solution.

In an aspect, the method can further include isolating the precipitate. Isolation can be using any liquid-solid separation technique, including, for example, filtration, centrifugation, and the like, or a combination thereof. The precipitate can be washed (e.g., with deionized water, distilled water, and the like, or a combination thereof) and dried (e.g., at a temperature of 80 to 100° C., for example 85 to 95° C., under nitrogen).

The method further comprises adding a lithium compound to the precipitate to form a lithiated precursor mixture (also referred to herein as "the mixture" for simplicity) and heat-treating the precursor mixture under conditions effective to provide the cathode active material. Exemplary lithium compounds can include lithium hydroxide, lithium carbonate, lithium oxide, lithium oxalate, or a combination thereof. In an aspect, the lithium compound can comprise lithium hydroxide. Heat-treating the mixture can comprise sintering at a temperature of 600 to 1000° C., 650 to 900° C., or 700 to 800° C. for 2 to 24 hours.

In an aspect, the cathode active material can comprise Ni, Co, Mn, Al, or combination thereof, in an amount corresponding to Formula 1: $Li_xMO_2$, wherein M is Ni, Co, Mn, Al, or a combination thereof and $0 \leq x \leq 1.4$. In an aspect, $0 \leq x \leq 1.1$.

In an aspect, the cathode active material can comprise Ni, Co, Mn, Al, or a combination thereof in an amount corresponding to Formula 2: $Li_xNi_yCo_zMn_vO_2$, wherein 0≤x≤1.4 and 0≤(y+z+v)≤1.1. In an aspect, 0≤x≤1.1. In an aspect, the resulting cathode active material can comprise $Li_xNi_{0.6}Co_{0.2}Mn_{0.2}$, $Li_xNi_{0.8}Co_{0.1}Mn_{0.1}$, or $Li_xNi_{0.9}Co_{0.5}Mn_{0.5}$, wherein 0.9<x<1.1.

In an aspect, the cathode active material can comprise Ni, Co, Mn, Al, or combination thereof in an amount corresponding to Formula 3: $mLi_2MnO_3 \cdot (1-m)LiMO_2$, wherein M is Ni, Co, Mn, Al, or a combination thereof and 0<m<1. For example, 0.2≤m≤0.5, or 0.33<m<0.5. In an aspect, M can be Ni, Co, and Mn. In an aspect, a ratio of Ni:Co:Mn can be greater than 0 to 1:greater than 0 to 1:greater than 0 to 1, preferably 1:0.33:0.33 (i.e., 6:2:2). In another aspect, M can be Ni, Co, and Al. In an aspect, a ratio of Ni:Co:Al can be greater than 0 to 1:greater than 0 to 1:greater than 0 to 1, preferably 1:0.056:0.056 (i.e., 90:5:5).

For example, in a specific aspect, the cathode active material can comprise $0.33Li_2MnO_3 \cdot 0.66LiNi_{0.6}Co_{0.2}Mn_{0.2}O_2$.

Other cathode active materials can be obtained according to the method described herein using alternate battery chemistries, alternate composition stoichiometries, or both.

A cathode active material prepared according to the method described herein represents another aspect of the present disclosure.

For example, in an aspect, a cathode active material can comprise a first layered $Li_xMO_2$ phase; and a second phase; wherein M is Ni, Co, Mn, Al, or a combination thereof and 0.9<x<1.4; and the second phase is derived from a recycled feedstock. In an aspect, 0.9<x<1.1. For example, the second phase can comprise a compound comprising one or more of Cu, Fe, Mg, Na, Ca, Zn, F, Si, Li, or a combination thereof. In an aspect, the second phase derived from a recycled feedstock is one or more of Cu, Fe, Mg, Na, Ca, Zn, Al, F, Si, Li, or a combination thereof. In an aspect, the second phase derived from the recycled feedstock is present in an amount of 0.01 to 10 weight percent (wt %), 0.1 to 5 wt %, or 0.2 to 2 wt %, based on the total weight of the cathode active material.

In an aspect, a cathode active material can comprise a layered $Li_xMO_2$ phase, wherein M is Ni, Co, Mn, Al, or a combination thereof and 0.9<x<1.4, and further include one or more of Cu, Fe, Mg, Na, Ca, Zn, F, Si, and Li, which may be derived from a recycled feedstock. In an aspect, 0.9<x<1.1.

In an aspect, a cathode active material can comprise a first phase and a second phase. The first phase can comprise a first domain of the formula $Li_2MnO_3$ and a second domain of the formula $LiMO_2$, wherein M is Ni, Co, Mn, Al, or a combination thereof. The second phase can be derived from a recycled feedstock. For example, the second phase can comprise a compound comprising one or more of Cu, Fe, Mg, Na, Ca, Zn, F, Si, Li, or a combination thereof. In an aspect, the second phase derived from a recycled feedstock is one or more of Cu, Fe, Mg, Na, Ca, Zn, Al, F, Si, Li, or a combination thereof. In an aspect, the second phase derived from the recycled feedstock is present in an amount of 0.01 to 10 weight percent (wt %), 0.1 to 5 wt %, or 0.2 to 2 wt %, based on the total weight of the cathode active material.

The cathode active material of the present disclose can exhibit one or more advantageous properties. For example, the cathode active material can have a discharge capacity of greater than 200 mAh/g at a discharge rate of C/3 for a half-cell over 100 cycles. In an aspect, the cathode active material can have a discharge capacity of greater than 180 mAh/g at a rate of C/3 for a full-cell over 100 cycles. These and other advantageous features are further described in the working examples below.

The cathode active material obtained by the method described herein can be particularly useful in a battery cathode. A battery cathode can therefore comprise a cathode active material made by the method described herein, optionally in combination with a virgin cathode active material (i.e., one which has not been prepared using a recycled feedstock). For example, the cathode active material of the present disclosure and a virgin cathode active material can be combined in a weight ratio of 1:99 to 99:1, or 10:90 to 90:10, or 20:80 to 80:20, or 30:70 to 70:30, or 40:60 to 60:40, or 45:55 to 55:45, or 50:50.

It can further be desirable to provide a purified mixed metal composition, for example a precursor cathode active material which has not yet been contacted with lithium to provide the final cathode active material. Accordingly, a method of making a purified mixed metal composition (i.e., a precursor cathode active material) represents another aspect of the present disclosure.

The method of making a purified mixed metal composition comprises contacting a mixed metal composition with water to form a first solution. The method further includes adding a salt of nickel, cobalt, manganese, aluminum, or a combination thereof to the first solution to provide a second solution and combining the second solution with a basic solution to form a precipitate comprising the purified mixed metal composition. The mixed metal composition, the first solution, the second solution, the basic solution, the precipitate, and various conditions for conducting the contacting, adding, and combining steps can be as described above.

The precipitate comprising the purified mixed metal composition can be isolated, washed, and dried, as already described in detail above. In an aspect, the mixed metal composition can comprise $Ni(OH)_2$, $Co(OH)_2$, and $Mn(OH)_2$, preferably in a molar ratio of greater than 0 to 1:greater than 0 to 1:greater than 0 to 1, preferably 6:2:2, 8:1:1 (1:0.125:0.125), or 9:0.5:0.5. In an aspect, the mixed metal composition can comprise $Ni(OH)_2$, $Co(OH)_2$, and $Al(OH)_3$. In an aspect, the mixed metal composition can comprise $Ni(OH)_2$, $Co(OH)_2$, $Mn(OH)_2$, and $Al(OH)_3$. The precipitate can further comprise a compound comprising one or more of Cu, Fe, Mg, Na, Ca, Zn, Al, F, Si, Li, or a combination thereof. In an aspect, the precipitate can further comprise one or more of Cu, Fe, Mg, Na, Ca, Zn, Al, F, Si, Li, or a combination thereof. For example, the precipitate can further comprise 5 to 100 ppm Li, for example 10 to 25 ppm Li, based on the total weight of the precipitated purified mixed metal composition. The precipitated purified mixed metal composition can optionally further comprise one or more of 50 to 300 ppm Cu, 50 to 200 ppm of Al, 5 to 100 ppm of Fe, and 5 to 100 ppm F, each based on the total weight of the mixed metal composition.

This disclosure is further illustrated by the following examples, which are non-limiting.

EXAMPLES

Comparative Example 1

Metal sulfate solution ($MSO_4$) having a concentration of 2 moles per liter (M) with a stoichiometric ratio of Ni:Mn:Co of 8:1:1 was prepared using battery grade starting materials. The impurities for each starting material are shown in Table 1.

TABLE 1

| Sulfate precursors | $NiSO_4 \cdot 6H_2O$ | $MnSO_4 \cdot H_2O$ | $CoSO_4 \cdot 7H_2O$ |
|---|---|---|---|
| Ca | ≤0.005% | NA | NA |
| Co | ≤0.002% | NA | >20.7% |
| Cu | ≤0.005% | NA | NA |
| Fe | ≤0.001% | NA | <50 ppm |
| K | ≤0.01% | NA | NA |
| Mg | ≤0.005% | NA | NA |
| Mn | ≤0.002% | >31.5% | NA |
| Na | ≤0.05% | NA | NA |
| Pb | NA | <4 ppm | <50 ppm |
| Se | NA | <0.003% | NA |
| Ni | >22.2% | NA | <500 ppm |

"NA" means data not available.

Separate feeds of $NH_3$ solution (5M) and NaOH solution (2M) were used as chelant and precipitant, respectively. A 3 L continuous stir tank reactor (CSTR) was charged with 0.75M $NH_3$ solution followed by coaddition of the metal sulfate solution (M504), $NH_3$, and NaOH. The flow rate for $MSO_4$ and $NH_3$ feeds were maintained at 0.108 L/h and 0.083 L/h, respectively, so that the ratio of $NH_3$/M was kept constant at 1.92. NaOH addition rate was also kept constant at 0.108 L/h to facilitate continuous precipitation. The system reached a steady state after 48-50 hours, at which point all reagent concentrations were constant. The reactor temperature was maintained at 50° C. with a stirring rate of 1085 RPM. By adjusting the metal and $NH_3$/NaOH feed, the solution pH was kept constant at 11.3. Continuous purging of Na to the solution as well as blanketing the solution was performed to prevent transition metal oxidation.

After the reaction reached steady state, the precipitates were filtered and washed with water. To ensure removal of any remaining sulfate ion or metal impurity ion on the precipitate surface, the conductivity of the filtrate solution was monitored until it was well below 400 μS/cm. The filtered wet cake was then dried at 90° C. under Na flow. Physical properties (tap density, particle size distribution and surface morphology) of the precursor cathode active material (pCAM) are shown below.

Figure 1B:
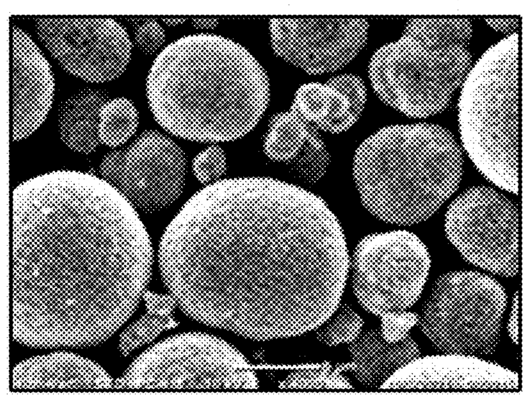
FIG. 1B shows a SEM image of a cathode active material after calcination at 750° C. under oxygen prepared according to Comparative Example 1. The scale bar is 5 μm.

Cathode active material (CAM) was prepared from the pCAM of Comparative Example 1 by mixing pulverized pCAM and lithium hydroxide monohydrate at a mole ratio of 1:1.05. followed by high temperature calcination under oxygen flow. The mixing was performed using a LABRAM sonic mixer and the ramp speed of the furnace temperature was 2° C./min until T1=750° C. was reached. The residence time was 12 hrs. After cooling, the CAM was pulverized and screened using a 350 mesh sieve. The CAM prepared from the pCAM of Comparative Example 1 was analyzed using scanning electron microscopy (SEM), shown in FIGS. 1A and 1B. Analysis by ICP-OES was consistent with Ni:Co:Mn of 8:1:1, as provided in Table 3.

Comparative Example 2

Cathode active material was prepared using the same materials and procedure as in Comparative Example 1, except that a temperature T1 of 800° C. was used during the CAM synthesis.

Example 1

Metal sulfate solution ($MSO_4$) having a concentration of 2M with a stoichiometric ratio of Ni:Mn:Co of 8:1:1 was prepared using 30 wt % of recycled mixed metal sulfate and 70 wt % battery grade starting materials (i.e., $NiSO_4$, $CoSO_4$, and $MnSO_4$,). The recycled mixed metal sulfate (MMS) comprises 20 wt % Ni and 0.86 wt % Co with trace amounts of impurities (e.g., Al, Cu). The compositional components of the recycled mixed metal sulfate are shown in Table 2.

TABLE 2

| Element | Wt % |
|---|---|
| Al | 0.012 |
| Ca | ND |
| Co | 0.86 |
| Cu | 0.018 |
| Fe | ND |
| Li | 0.042 |
| Mg | 0.0021 |
| Mn | ND |
| Na | ND |
| Ni | 20 |
| S | 11 |
| $SO_4$ (calc) | 33 |

Figure 2A:
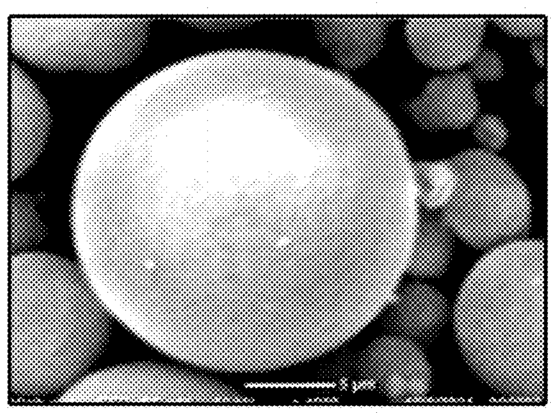
FIG. 2A shows a SEM image of a precursor cathode active material prepared according to Example 1. The scale bar is 5 μm.
Figure 2B:
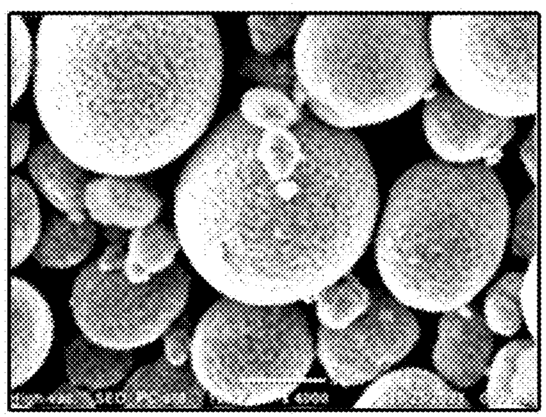
FIG. 2B shows a SEM image of a cathode active material after calcination at 750° C. under oxygen prepared according to Example 1. The scale bar is 5 μm.

The precursor cathode active material (pCAM) was prepared from the Example 1 composition using the same process as described for Comparative Example 1 except that 30 wt % of the mixed metal sulfate (MMS) was used in the metal feed solution. Cathode active material (CAM) was prepared from the pCAM of Example 1 by mixing pulverized pCAM and lithium hydroxide monohydrate at a mole ratio of 1:1.05, followed by high temperature calcination under oxygen flow. The mixing was performed using a LABRAM sonic mixer and the ramp speed of the furnace temperature was 2° C./min until 750° C. was reached. The residence time at 750° C. was 12 hrs. After cooling, the CAM was pulverized and screened using a 350 mesh sieve. The CAM prepared from the pCAM of Example 1 was analyzed using scanning electron microscopy (SEM), shown in FIGS. 2A and 2B. Analysis by ICP-OES was consistent with Ni:Co:Mn of 8:1:1, as provided in Table 3.

Example 2

Cathode active material was prepared using the same materials and procedure as in Example 1, except that a temperature T1 of 800° C. was used during the CAM synthesis.

Example 3

Figure 3A:
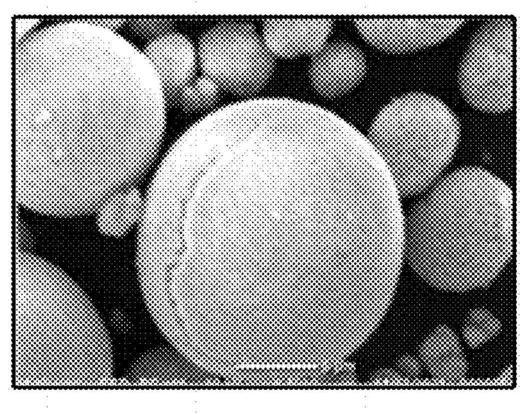
FIG. 3A shows a SEM image of a precursor cathode active material prepared according to Example 3. The scale bar is 5 μm.
Figure 3B:
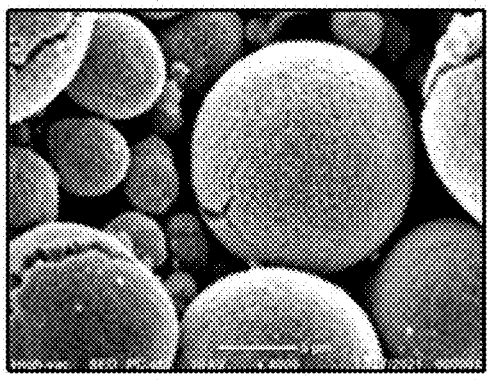
FIG. 3B shows a SEM image of a cathode active material after calcination at 750° C. under oxygen prepared according to Example 3. The scale bar is 5 μm.
Figure 4A:
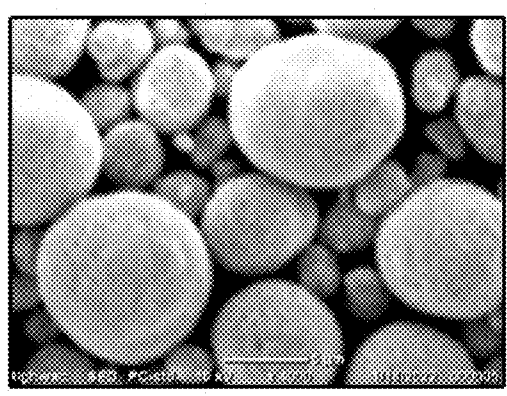
FIG. 4A shows a SEM image of a precursor cathode active material prepared according to Example 4. The scale bar in FIG. 4A is 5 μm.
Figure 4B:
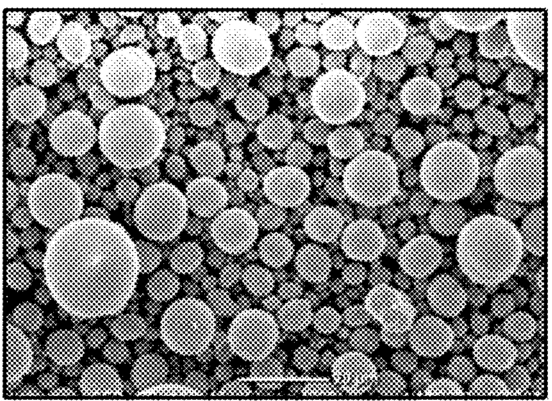
FIG. 4B shows a SEM image of a precursor cathode active material prepared according to Example 4. The scale bar in FIG. 4B 20 μm.
Figure 4C:
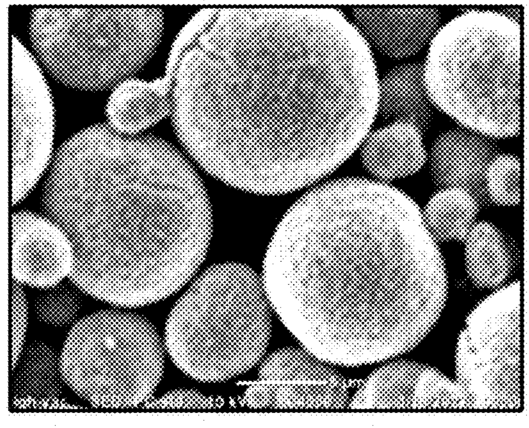
FIG. 4C shows a SEM image of a cathode active material after calcination at 750° C. under oxygen prepared according to Example 4. The scale bar in FIG. 4C is 5 μm.
Figure 4D:
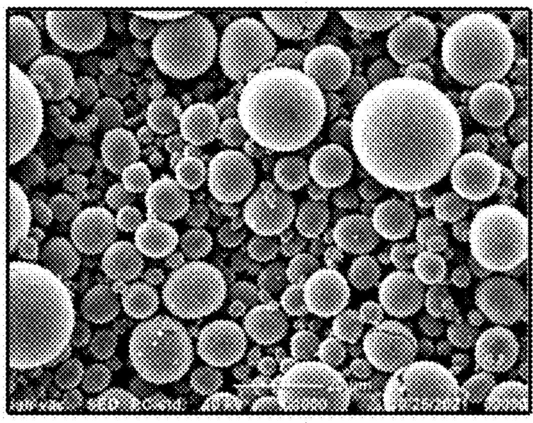
FIG. 4D shows a SEM image of a cathode active material after calcination at 750° C. under oxygen prepared according to Example 4. The scale bar in FIG. 4D 20 μm.

Metal sulfate solution (M504) having a concentration of 2M with a stoichiometric ratio of Ni:Mn:Co of 8:1:1 was prepared using 60 wt % of recycled mixed metal sulfate and 30 wt % battery grade raw materials (i.e., $NiSO_4$, $MnSO_4$, $CoSO_4$). The same process was used to make pCAM and CAM as in Example 1 except for 60 wt % of the mixed metal sulfate (MMS) was used in the metal feed solution. The CAM prepared from the pCAM of Example 3 was analyzed using scanning electron microscopy (SEM), shown in FIGS. 3A and 3B. Analysis by ICP-OES was consistent with Ni:Co:Mn of 8:1:1, as provided in Table 3.

Example 4

Metal sulfate solution ($MSO_4$) having a concentration of 2M with a stoichiometric ratio of Ni:Mn:Co of 8:1:1 was prepared using 90 wt % of recycled mixed metal sulfate and 10 wt % battery grade starting material. The same process was used to make pCAM and CAM as in Example 1 except that 90 wt % mixed metal sulfate (MMS) was used in the metal feed solution. The CAM prepared from the pCAM of Example 4 was analyzed using scanning electron microscopy (SEM), shown in FIGS. 4A-4D, which shows comparable pCAM and CAM morphology and particle size distribution compared to Comparative Example 1.

Physical properties for the pCAM and CAM according to Comparative Example 1 and Examples 1 and 3, and the results of ICP analysis, are summarized in Table 3. "CE" is used to designate a Comparative Example, and "E" is used to designate an Example.

TABLE 3

| | Units | CE1 | E1 | E3 |
|---|---|---|---|---|
| pCAM Tap Density | g/cc | 1.93 | 1.91 | 1.913 |
| pCAM D 10 | μm | 6.5 | 8.7 | 7.85 |
| pCAM D 50 | μm | 14.3 | 17.1 | 13.61 |
| pCAM D 90 | μm | 27.6 | 30.92 | 20.44 |
| ICP Assay (mol %) | % Ni:% Mn:% Co | 79.7:10:10.3 | 80:9.9:10.1 | 78:11:11 |

Electrode Preparation

CAM powder was mixed with conductive carbon black and polyvinylidene fluoride (PVDF) binder at a ratio of 84:8:8 by weight. Together with NMP to adjust the slurry rheology, the mixture was subjected to mixing using a THINKY mixer. The slurry was casted on Al foil using a 254 micrometer (μm) doctor blade followed by 75° C. quick drying to remove the NMP solvent. The casted filmed was then further dried at 100° C. under vacuum to facilitate PVDF curing and complete NMP removal. A coin half cell (CR2025) with a Li metal anode and a coin full cell with graphite anode was assembled and tested using a MACCOR tester.

Rate Capability Testing

Figure 5:
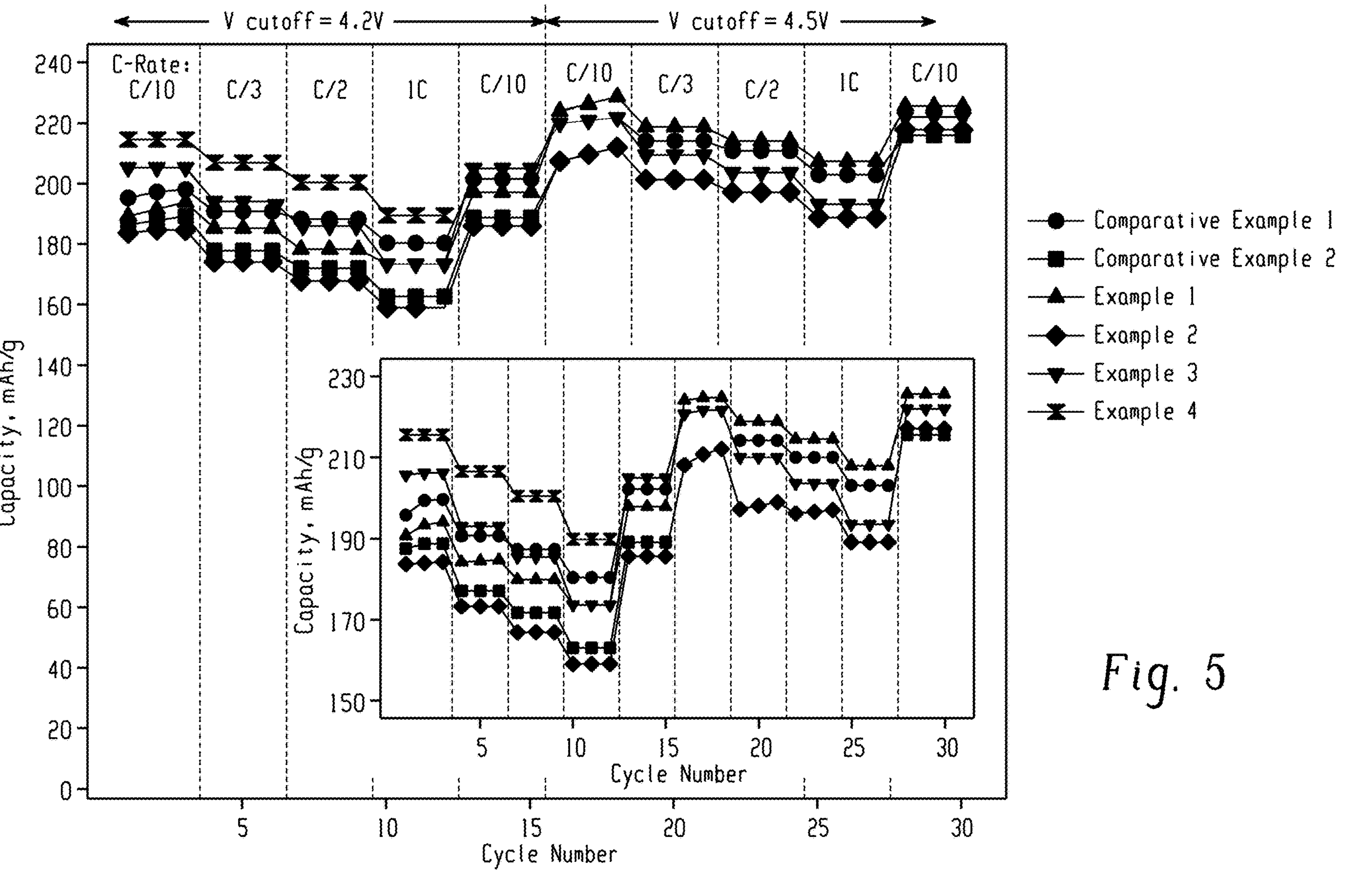
FIG. 5 is a graph of discharge capacity (mAh/g) versus cycle number for half cells including cathode active materials according to Comparative Examples 1 and 2, and Examples 1 to 4. Inset is an expanded view.

The half-cell was charged using a constant current/constant voltage (CC-CV) protocol at C/10 constant charge current until 4.2V was reached, followed by constant voltage charging until charging current dropped to C/20. The cell was discharged at different C rates as shown in FIG. 5 for cycles 1-15 with discharge cutoff voltage of 2.5V. The C rate is defined using a discharge capacity at a C/10 rate. A C rate means a current which will discharge a battery in one hour, e.g., a C rate for a battery having a discharge capacity of 1 ampere-hours would be 1 ampere.

A similar charging protocol was used for cycles 16-30 except that a charging cutoff voltage of 4.5V was used. As shown in FIG. 5, the cathode active materials made from recycled feedstock, such as Example 4 which provided 215 mAh/g at a C/10 rate, provided greater capacity than materials made from battery grade low impurity raw materials, e.g., Comparative Example 1, which provided 200 mAh/g at a C/10 rate. The results shown in FIG. 5 suggest that cathode active materials made from recycled feedstock can provide similar or improved discharge capacity relative to those made from battery grade low impurity raw materials.

The pCAM calcination temperature was also observed to impact electrochemical performance. As shown in FIG. 5, samples calcined at 800° C. (Comparative Example 2 and Example 2) exhibit lower discharge capacity compared to samples calcined at 750° C. (Comparative Example 1 and Example 1, respectively). Without wishing to be bound by theory, it is believed that excess sintering of primary particles as well as Li loss at high temperatures may contribute to the reduced capacity observed when a higher calcination temperature is used. Surface reconstruction of the CAM surface may also contribute to the decrease in the capacity.

Figure 6A:
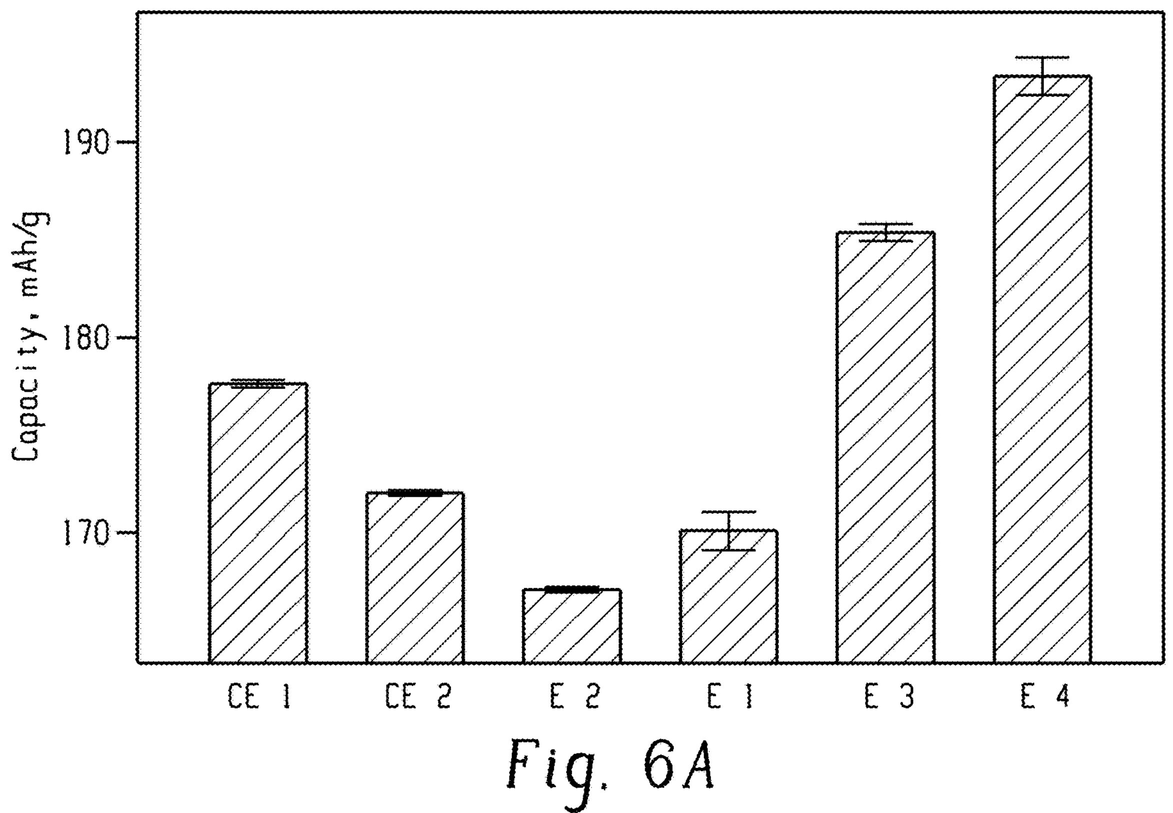
FIG. 6A shows the C/3 discharge capacity (mAh/g) for Comparative Examples 1 and 2, and Examples 1 to 4 after charging to 4.2V.
Figure 6B:
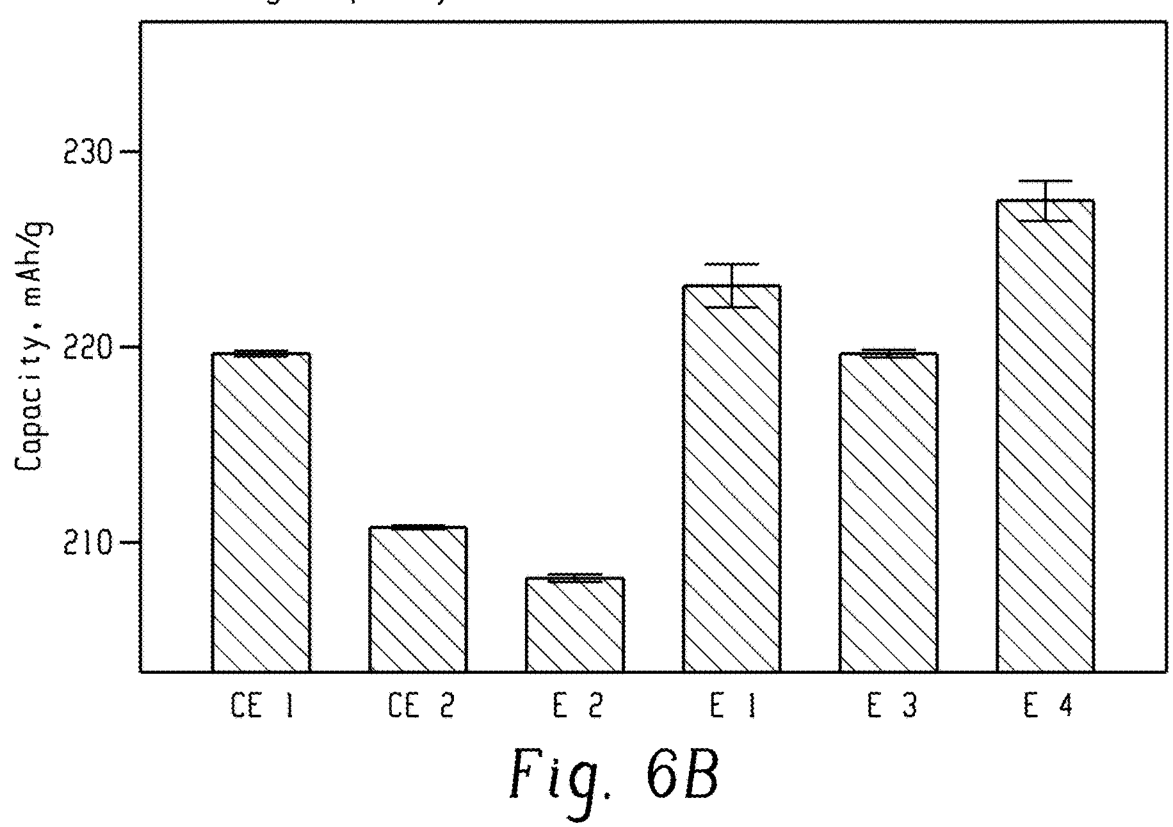
FIG. 6B shows the C/3 discharge capacity (mAh/g) for Comparative Examples 1 and 2, and Examples 1 to 4 after charging to 4.5V.

FIG. 6A shows the comparison of discharge capacity at C/3 rate at a charge cutoff voltage of 4.2V, and FIG. 6B shows the comparison of discharge capacity at C/3 rate at a charge cutoff voltage of 4.5V. A higher discharge capacity was observed at a cutoff voltage of 4.2V for the cathode active materials prepared from the recycled MMS. When using a 4.5V cutoff voltage, a greater discharge capacity was observed increasing recycled MMS amounts. When using a 4.5V cutoff voltage, higher capacity was observed, and when a high content of MMS, e.g., 90 wt %, was used in making the pCAM and CAM materials, a statistically significant high discharge capacity was observed. These results suggest using recycled MMS in the metal feed solution for making pCAM and CAM can be advantageous in electrochemical performance (e.g., rate capability and discharge capacity).

Half Cell Cycle Life

Figure 7:
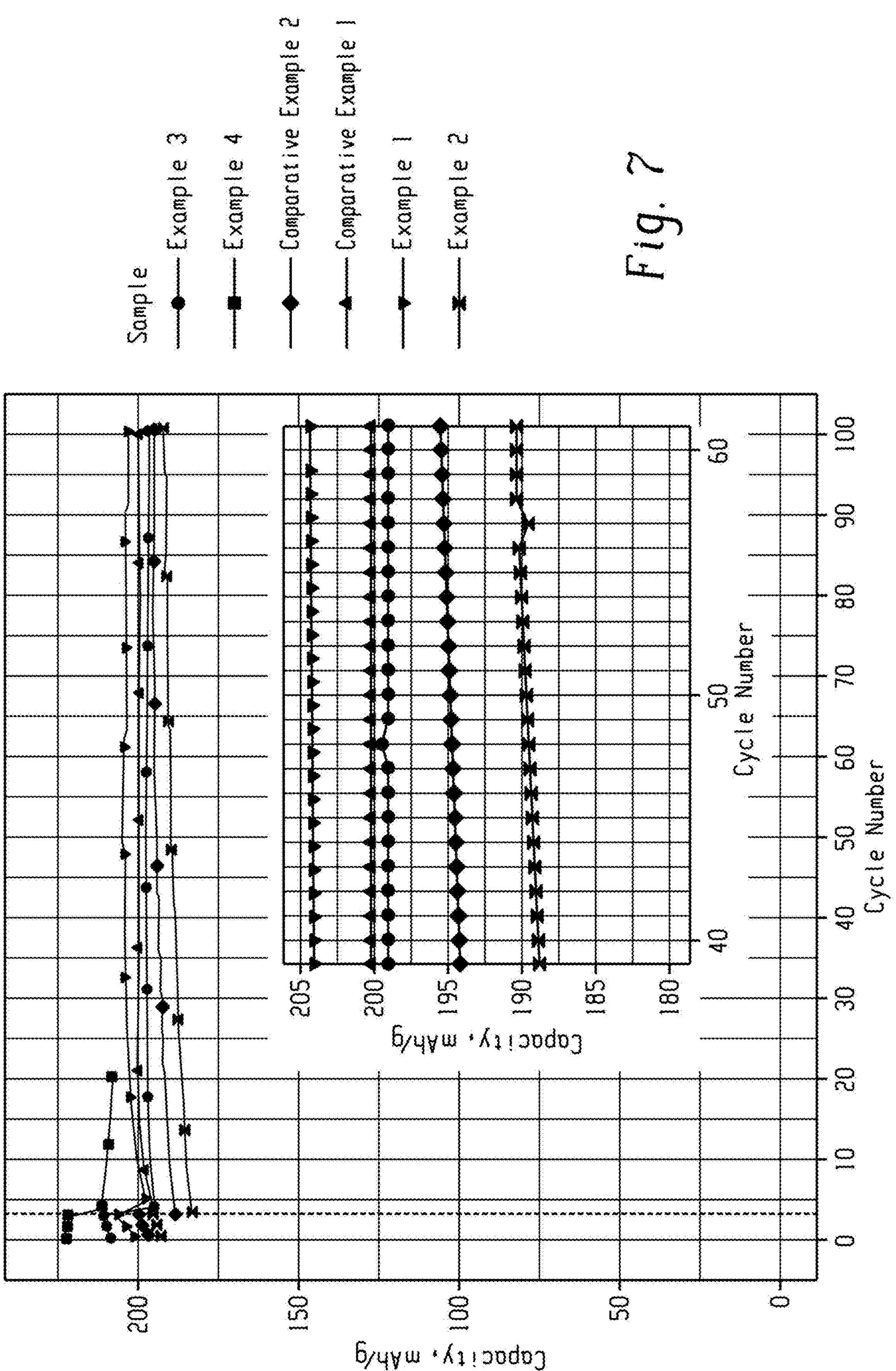
FIG. 7 is a graph of discharge capacity (mAh/g) versus cycle number for Comparative Examples 1 and 2, and Examples 1 to 4 when cycled at a C/3 charge/discharge rate.

Coin full cell cycle life performance was evaluated according to the test procedure described in J. Electrochem. Soc., 163 (2016) A2999, the contents of which is incorporated herein by reference in its entirety. To further differentiate cycle life performance, three hours of constant voltage charging was added to each cycle to mimic accelerated aging. Half cells include Li metal as the anode. FIG. 7 shows the capacity does not change significantly over the course of 100 cycles at a C/3 rate. This result suggests cathode materials made from recycled MMS can perform comparably to those made from virgin battery grade materials.

Full Cell Cycle Life and Hybrid Pulse Power Characterization (HPPC)

Figure 8:
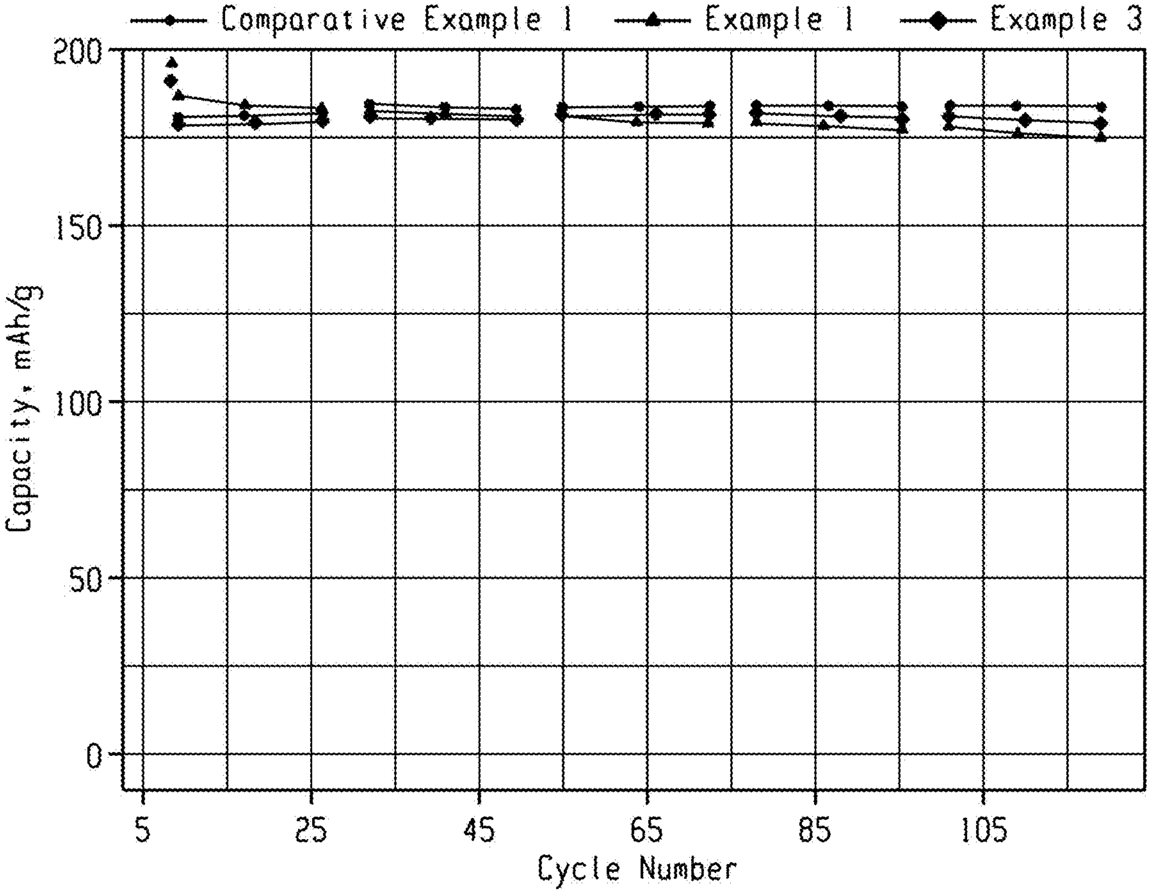
FIG. 8 is a graph of discharge capacity versus cycle number illustrating the full-cell cycle life of Comparative Example 1 (circles), Examples 1 (triangles) and 3 (diamonds) when charged and discharged at a C/3 rate.

To better evaluate the performance of the cathode, full coin cells with a graphite anode were made. FIG. 8 illustrates that full-cell cycle life of Comparative Example 1 (circles), Examples 1 (triangles) and 3 (diamonds), and shows no significant change in discharge capacity over 100 or more cycles when charged and discharged at a C/3 rate.

Figures 9A, 9B, 9C, 9D, 9E, 9F:
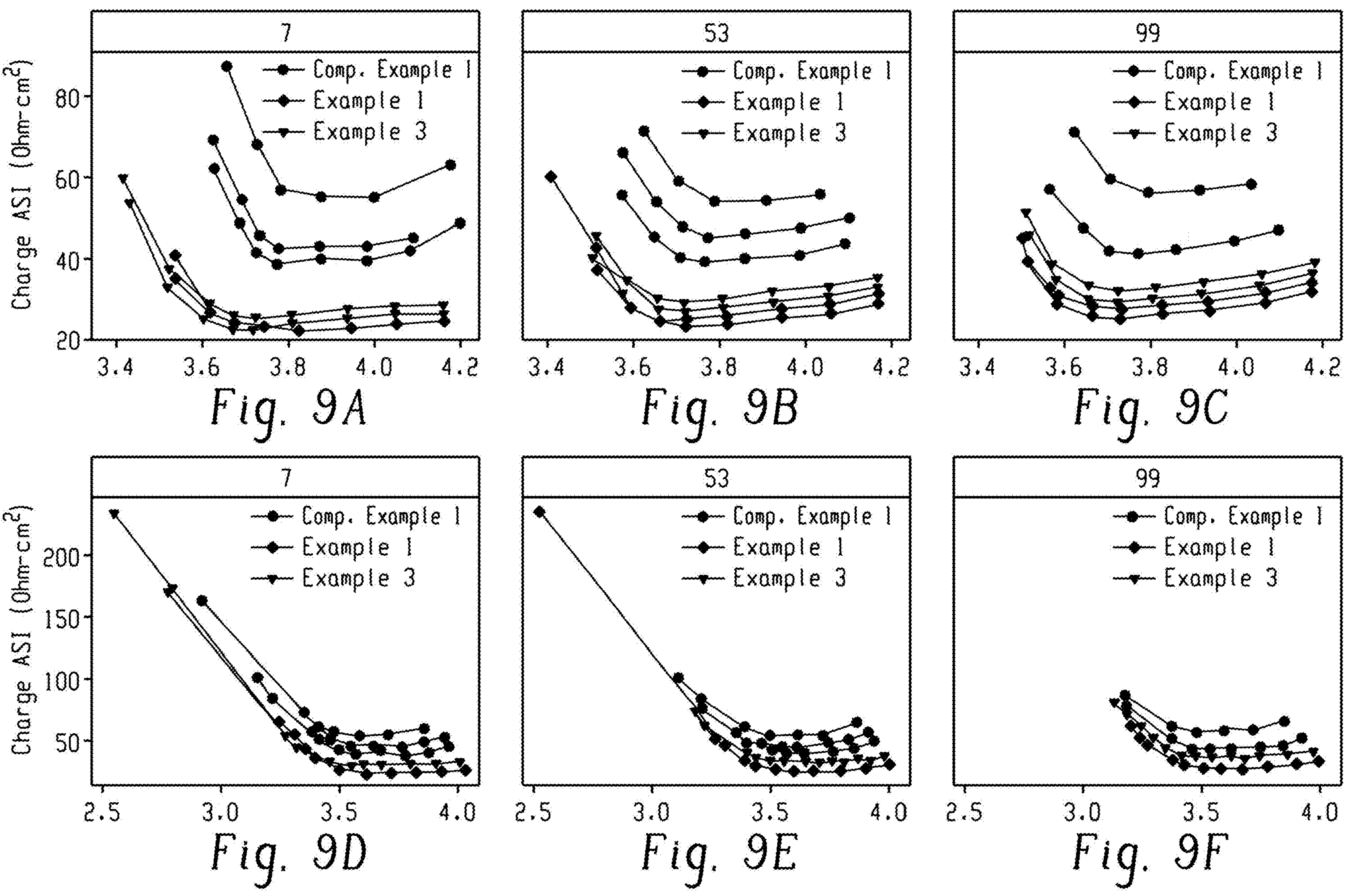
FIGS. 9A to 9F are each a graph of area specific impedance (ohm-cm$^2$) versus voltage (V vs. Li/Li$^+$) showing the results of impedance analysis at cycles 7, 53, and 99 for Comparative Example 1 (circles), and Examples 1 (diamonds) and 3 (inverted triangles).

A HPPC test with both charge and discharge cycles was performed after every twenty C/3 cycles. Low cell impedance is preferred as impedance growth can negatively impact charge and discharge efficiency. FIG. 9 shows that cells made with recycled MMS have a low area specific impedance (ASI) over both charge and discharge cycles in the HPPC test. Lower ASI indicates potential good extended cycling performance.

This disclosure further encompasses the following aspects.

Aspect 1: A method of making a cathode active material, the method comprising: contacting a mixed metal composition with water to form a first solution, the mixed metal composition comprising nickel, cobalt, manganese, aluminum, or a combination thereof; and greater than 0 to 2 weight percent, based on the total weight of the mixed metal composition, of a compound comprising Cu, Fe, Mg, Na, Ca, Zn, F, Si, Li, or a combination thereof; adding a salt of nickel, cobalt, manganese, aluminum, or a combination thereof to the first solution to provide a second solution; combining the second solution and a basic solution to form a precipitate; adding a lithium compound to the precipitate to form a mixture; and heat-treating the mixture to form the cathode active material.

Aspect 2: The method of aspect 1, wherein the mixed metal composition is obtained by a method comprising contacting electrode particles comprising nickel, cobalt, manganese, aluminum, or a combination thereof; and greater than 0 to 2 weight percent, based on the total weight of the mixed metal composition, of a compound comprising Cu, Fe, Mg, Na, Ca, Zn, F, Si, Li, or a combination thereof; with a leaching solution, preferably comprising sulfuric acid; precipitating the mixed metal composition from the leaching solution; and isolating the mixed metal composition from the leaching solution.

Aspect 3: The method of aspect 1 or 2, wherein the mixed metal composition comprises a mixed metal sulfate, a mixed metal nitrate, a mixed metal carbonate, a mixed metal halide, a mixed metal hydroxide, a mixed metal oxalate, or a combination thereof.

Aspect 4: The method of any of aspects 1 to 3, wherein the mixed metal composition comprises a mixed metal sulfate.

Aspect 5: The method of any of aspects 1 to 4, wherein mixed metal composition comprises: nickel and cobalt, and greater than 0 to 2 weight percent, based on the total weight of the mixed metal composition, of Cu, Fe, Mg, F, or a combination thereof.

Aspect 6: The method of any of aspects 1 to 5, wherein the mixed metal composition further comprises lithium, preferably in an amount of 100 to 1000 ppm, based on the total weight of the mixed metal composition.

Aspect 7: The method of any of aspects 1 to 6, wherein the mixed metal composition is obtained from a recycled feedstock, preferably a post-industrial recycled feedstock, a post-consumer recycled feedstock, or a combination thereof.

Aspect 8: The method of any of aspects 1 to 7, wherein the mixed metal composition comprises 50 to 300 ppm Cu, 50 to 200 ppm of Al, 5 to 100 ppm of Fe, and 5 to 100 ppm of F, each based on the total weight of the mixed metal composition.

Aspect 9: The method of any of aspects 1 to 8, wherein the first solution has a pH of less than 7, or less than 6.5.

Aspect 10: The method of any of aspects 1 to 9, wherein the salt of nickel, cobalt, manganese, aluminum, or a combination thereof is a sulfate or a hydroxide thereof.

Aspect 11: The method of any of aspects 1 to 10, wherein the mixed metal composition comprises nickel, cobalt, and manganese, and the method comprises adding a salt of nickel, cobalt, and manganese to the first solution in an amount effective to provide a molar ratio of Ni:Co:Mn of greater than 0 to 1:greater than 0 to 1:greater than 0 to 1, preferably 1:0.125:0.125.

Aspect 12: The method of aspect 11, wherein the salt comprises $NiSO_4$, $CoSO_4$, and $MnSO_4$.

Aspect 13: The method of any of aspects 1 to 12, wherein the second solution has a pH of less than 7, or less than 6.5.

Aspect 14: The method of any of aspects 1 to 13, wherein the second solution comprises of 0.0001 to 2 weight percent, based on the total weight of the solution, of Cu, Fe, Mg, Na, Ca, Zn, F, Si, Li, or a combination thereof.

Aspect 15: The method of any of aspects 1 to 14, wherein the basic solution comprises a base comprising an alkali metal hydroxide, ammonia, or a combination thereof, preferably sodium hydroxide and ammonia, more preferably wherein the sodium hydroxide and ammonia are present in a ratio of 1.04:1 to 1:1.04, preferably 1.01:1 to 1:1.01, more preferably 1:1.

Aspect 16: The method of any of aspects 1 to 15, wherein the basic solution is combined with the second solution in an amount effective to provide a pH of greater than or equal to 10, preferably 10-13, more preferably 11-12.

Aspect 17: The method of any of aspects 1 to 16, wherein no precipitate is separated from the second solution at a pH of less than 10.

Aspect 18: The method of any of aspects 1 to 17, further comprising adding a chelating agent to the second solution, preferably wherein the chelating agent is present in the second solution in an amount of 0.1 to 10 M.

Aspect 19: The method of any of aspects 1 to 18, wherein the precipitate comprises $Ni(OH)_2$, $Co(OH)_2$, and $Mn(OH)_2$, preferably in a molar ratio of greater than 0 to 1:greater than 0 to 1:greater than 0 to 1, preferably 1:0.125:0.125.

Aspect 20: The method of any of aspects 1 to 19, wherein the precipitate comprises 5 to 100 ppm Li, preferably 10 to 25 ppm Li, based on the total weight of the precipitate.

Aspect 21: The method of any of aspects 1 to 20, wherein the lithium compound comprises lithium hydroxide, lithium carbonate, lithium oxide, lithium oxalate, or a combination thereof.

Aspect 22: The method of any of aspects 1 to 21, wherein the cathode active material comprises Ni, Co, Mn, Al, or combination thereof in an amount corresponding to Formula 1: $Li_xMO_2$, wherein M is Ni, Co, Mn, Al, or a combination thereof and $0 \leq x \leq 1.4$.

Aspect 23: The method of aspect 22, wherein $0 \leq x \leq 1.1$.

Aspect 24: The method of any of aspects 1 to 23, wherein the cathode active material comprises Ni, Co, Mn, Al, or combination thereof in an amount corresponding to Formula 2: $Li_xNi_yCo_zMn_vO_2$, wherein $0 \leq x \leq 1.4$ and $0 \leq (y+z+v) \leq 1.1$.

Aspect 25: The method of aspect 23, wherein $0 \leq x \leq 1.1$.

Aspect 26: The method of any of aspects 1 to 25, wherein the cathode active material comprises $LiNi_{0.8}Co_{0.1}Mn_{0.1}$.

Aspect 27: The method of any of aspects 1 to 21, wherein the cathode active material comprises Ni, Co, Mn, Al, or combination thereof in an amount corresponding to Formula 3: $mLi_2MnO_3 \cdot (1-m)LiMO_2$ wherein M is Ni, Co, Mn, Al, or a combination thereof; and $0 \leq m \leq 1$.

Aspect 28: The method of aspect 27, wherein $0.2 \leq m \leq 0.5$.

Aspect 29: The method of any of aspects 27 and 28, wherein M is Ni, Co, and Mn.

Aspect 30: The method of any of aspects 27 to 29, wherein a ratio of Ni:Co:Mn is greater than 0 to 1:greater than 0 to 1:greater than 0 to 1, preferably 6:2:2.

Aspect 31: The method of any of aspects 27 and 28, wherein M is Ni, Co, and Al.

Aspect 32: The method of any of aspects 27, 28, and 31, wherein a ratio of Ni:Co:Al is greater than 0 to 1:greater than 0 to 1:greater than 0 to 1, preferably 90:5:5.

Aspect 33: The method of aspect 27, wherein the cathode active material comprises $0.33Li_2MnO_3 \cdot 0.66LiNi_{0.6}Co_{0.2}Mn_{0.2}O_2$.

Aspect 34: The method of any of aspects 1 to 33, wherein the heat-treating comprises sintering at a temperature of 600 to 1000° C. for 2 to 24 hours.

Aspect 35: The method of any of aspects 1 to 34, further comprising agitating the second solution at a speed of 500-1500 RPM at a temperature of 25 to 90° C.

Aspect 36: The method of any of aspects 1 to 35, further comprising isolating the precipitate.

Aspect 37: The method of any of aspects 1 to 36, further comprising combining the cathode active material with a virgin cathode active material.

Aspect 38: The method of aspect 37, wherein the cathode active material and the virgin cathode active material are combined in a weight ratio of 1:99 to 99:1.

Aspect 39: A cathode active material made by the method of any of aspects 1 to 38.

Aspect 40: A cathode active material comprising: a first layered $Li_xMO_2$ phase; and a second phase; wherein M is Ni, Co, Mn, Al, or a combination thereof and $0<x<1.4$; and the second phase is derived from a recycled feedstock.

Aspect 41: The cathode active material of aspect 40, wherein 0<x<1.1.

Aspect 42: The cathode active material of aspect 40 or 41, wherein the second phase comprises one or more of Cu, Fe, Mg, Na, Ca, Zn, F, Si, Li, or a combination thereof.

Aspect 43: The cathode active material of any of aspects 40 to 42, wherein the second phase is derived from a recycled feedstock is present in an amount of 1 to 99 weight percent, based on the total weight of the cathode active material.

Aspect 44: A cathode active material comprising: a first layered phase comprising $Li_xMO_2$, wherein M is Ni, Co, Mn, Al, or a combination thereof and 0<x<1.4; and wherein the first layered phase further comprises Cu, Fe, Mg, Na, Ca, Zn, F, Si, Li, or a combination thereof.

Aspect 45: The cathode active material of aspect 44, wherein 0<x<1.1.

Aspect 46: The cathode active material of aspect 44 or 45, wherein the Cu, Fe, Mg, Na, Ca, Zn, F, Si, Li, or a combination thereof is derived from a recycled feedstock.

Aspect 47: The cathode active material of any of aspects 40 to 46, wherein the cathode active material has a discharge capacity of greater than 200 mAh/g at a discharge rate of C/3 for a half-cell over 100 cycles.

Aspect 48: The cathode active material of any of aspects 40 to 47, wherein the cathode active material has a discharge capacity of greater than 180 mAh/g at a rate of C/3 for a full-cell over 100 cycles.

Aspect 49: A cathode active material comprising: a first phase; and a second phase; wherein the first phase comprises a first domain of the formula $Li_2MnO_3$ and a second domain of the formula $LiMO_2$, wherein M is Ni, Co, Mn, Al, or a combination thereof; and the second phase is derived from a recycled feedstock.

Aspect 50: The cathode active material of aspect 49, wherein the second phase comprises one or more of Cu, Fe, Mg, Na, Ca, Zn, F, Si, Li, or a combination thereof.

Aspect 51: The cathode active material of aspect 49, wherein the first phase is derived from a recycled feedstock.

Aspect 52: A method of making a purified mixed metal composition, the method comprising: contacting a mixed metal composition comprising nickel, cobalt, manganese, aluminum, or a combination thereof; and greater than 0 to 2 weight percent, based on the total weight of the mixed metal composition, of Cu, Fe, Mg, Na, Ca, Zn, F, Si, Li, or a combination thereof; with water to form a first solution; adding a salt of nickel, cobalt, manganese, aluminum, or a combination thereof to the first solution to provide a second solution; combining the second solution and a basic solution to form a precipitate comprising the purified mixed metal composition.

Aspect 53: The method of aspect 52, wherein the mixed metal composition is obtained by a method comprising contacting electrode particles comprising nickel, cobalt, manganese, aluminum, or a combination thereof; and greater than 0 to 2 weight percent, based on the total weight of the mixed metal composition, of a compound comprising Cu, Fe, Mg, Na, Ca, Zn, F, Si, Li, or a combination thereof; with a leaching solution, preferably comprising sulfuric acid; precipitating the mixed metal composition from the leaching solution; and isolating the mixed metal composition from the leaching solution.

Aspect 54: The method of aspect 52 or 53, wherein the purified mixed metal composition comprises 5 to 100 ppm Li, preferably 10 to 25 ppm Li, based on the total weight of the precipitate.

Aspect 55: The method of any of aspects 52 to 54, wherein the mixed metal composition comprises a mixed metal sulfate, a mixed metal nitrate, a mixed metal carbonate, a mixed metal halide, a mixed metal hydroxide, a mixed metal oxalate, or a combination thereof, preferably a mixed metal sulfate.

Aspect 56: The method of any of aspects 52 to 55, wherein the mixed metal composition is obtained from a recycled feedstock, preferably a post-industrial recycled feedstock, a post-consumer recycled feedstock, or a combination thereof.

Aspect 57: The method of any of aspects 52 to 56, wherein the mixed metal composition comprises 50 to 300 ppm Cu, 50 to 200 ppm of Al, 5 to 100 ppm of Fe, and 5 to 100 ppm F, each based on the total weight of the mixed metal composition.

Aspect 58: The method of any of aspects 52 to 57, wherein the first solution has a pH of less than 7, or less than 6.5.

Aspect 59: The method of any of aspects 52 to 58, wherein the salt of nickel, cobalt, manganese, aluminum, or a combination thereof is a sulfate or a hydroxide thereof.

Aspect 60: The method of any of aspects 52 to 59, wherein the mixed metal composition comprises nickel, cobalt, and manganese, and the method comprises adding a salt of nickel, cobalt, and manganese to the first solution in an amount effective to provide a molar ratio of Ni:Co:Mn of greater than 0 to 1:greater than 0 to 1:greater than 0 to 1, preferably 1:0.125:0.125.

Aspect 61: The method of any of aspects 52 to 60, wherein the second solution has a pH of less than 7, or less than 6.5.

Aspect 62: The method of any of aspects 52 to 61, wherein the basic solution comprises a base comprising an alkali metal hydroxide, ammonia, or a combination thereof, preferably sodium hydroxide and ammonia, more preferably wherein the sodium hydroxide and ammonia are present in a ratio of 1.04:1 to 1:1.04, preferably 1.01:1 to 1:1.01, more preferably 1:1.

Aspect 63: The method of any of aspects 52 to 62, wherein the basic solution is combined with the second solution in an amount effective to provide a pH of greater than or equal to 10, preferably 10-13, more preferably 11-12.

Aspect 64: The method of any of aspects 52 to 63, wherein no precipitate is separated from the second solution at a pH of less than 10.

Aspect 65: The method of any of aspects 52 to 64, further comprising adding a chelating agent to the second solution, preferably wherein the chelating agent is present in the second solution in an amount of 0.1 to 10 M.

Aspect 66: The method of any of aspects 52 to 65, wherein the purified mixed metal composition comprises $Ni(OH)_2$, $Co(OH)_2$, and $Mn(OH)_2$, preferably in a molar ratio of greater than 0 to 1:greater than 0 to 1:greater than 0 to 1, preferably 1:0.125:0.125.

Aspect 67: A purified mixed metal composition made by the method of any of aspects 52 to 66.

Aspect 68: A purified mixed metal composition comprising: $Ni(OH)_2$, $Co(OH)_2$, and $Mn(OH)_2$, preferably in a molar ratio of greater than 0 to 1:greater than 0 to 1:greater than 0 to 1, preferably 1:0.125:0.125; and one or more of Cu, Fe, Mg, Na, Ca, Zn, Al, F, Si, Li, or a combination thereof.

Aspect 69: The purified mixed metal composition of aspect 68 comprising 5 to 100 ppm Li, preferably 10 to 25 ppm Li, based on the total weight of the precipitate.

The compositions and methods can alternatively comprise, consist of, or consist essentially of, any appropriate materials, steps, or components herein disclosed. The compositions and methods can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Various aspects are shown in the accompanying drawings. This invention may, however, be embodied in many different forms, and should not be construed as limited to the aspects set forth herein. Rather, these aspects are provided so that this disclosure will be thorough and complete, and will fully convey the scope of the invention to those skilled in the art. Like reference numerals refer to like elements throughout.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

U.S. Provisional Patent Application No. 63/311,535 filed Feb. 18, 2022 and U.S. Provisional Patent Application No. 63/341,270, filed on May 12, 2022 are hereby incorporated by reference in their entirety for all purposes.

While a particular aspect has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of making a cathode active material, the method comprising:

contacting a mixed metal composition with water to form a first solution, the mixed metal composition comprising nickel, cobalt, manganese, aluminum, or a combination thereof; and greater than 0 to 2 weight percent, based on the total weight of the mixed metal composition, of a compound comprising Cu, Fe, Mg, Na, Ca, Zn, F, Si, Li, or a combination thereof;

adding a salt of nickel, cobalt, manganese, aluminum, or a combination thereof to the first solution to provide a second solution;

combining the second solution and a basic solution to form a precipitate, wherein the second solution comprises a stoichiometrically-adjusted mixed metal composition, and the stoichiometrically-adjusted mixed metal composition comprises 10 to 95 weight percent of the mixed metal composition, based on a total weight of the stoichiometrically-adjusted mixed metal composition;

adding a lithium compound to the precipitate to form a mixture; and heat-treating the mixture to form the cathode active material.

2. The method of claim 1, wherein the mixed metal composition is obtained by a method comprising contacting electrode particles comprising nickel, cobalt, manganese, aluminum, or a combination thereof; and greater than 0 to 2 weight percent, based on the total weight of the mixed metal composition, of a compound comprising Cu, Fe, Mg, Na, Ca, Zn, F, Si, Li, or a combination thereof;

with a leaching solution;

precipitating the mixed metal composition from the leaching solution; and isolating the mixed metal composition from the leaching solution.

3. The method of claim 1, wherein the mixed metal composition comprises a mixed metal sulfate, a mixed metal nitrate, a mixed metal carbonate, a mixed metal halide, a mixed metal hydroxide, a mixed metal oxalate, or a combination thereof.

4. The method of claim 1, wherein mixed metal composition comprises:

nickel and cobalt, and greater than 0 to 2 weight percent, based on the total weight of the mixed metal composition, of Cu, Fe, Mg, F, or a combination thereof.

5. The method of claim 1, wherein the mixed metal composition further comprises lithium 50 to 300 ppm Cu, 50 to 200 ppm of Al, 5 to 100 ppm of Fe, or 5 to 100 ppm of F, each based on the total weight of the mixed metal composition.

6. The method of claim 1, wherein at least a portion of the mixed metal composition is obtained from a recycled feedstock.

7. The method of claim 1, wherein the first solution has a pH of less than 7, or wherein the second solution has a pH of less than 7.

8. The method of claim 1, wherein the salt of nickel, cobalt, manganese, aluminum, or a combination thereof is a sulfate or a hydroxide thereof.

9. The method of claim 1, wherein the mixed metal composition comprises nickel, cobalt, and manganese, and the method comprises adding a salt of nickel, cobalt, and manganese to the first solution in an amount effective to provide a molar ratio of Ni:Co:Mn of greater than 0 to 1:greater than 0 to 1:greater than 0 to 1.

10. The method of claim 1, wherein the basic solution is combined with the second solution in an amount effective to provide a pH of greater than or equal to 10.

11. The method of claim 1, wherein the precipitate comprises $Ni(OH)_2$, $Co(OH)_2$, and $Mn(OH)_2$.

12. The method of claim 1, wherein the precipitate comprises 5 to 100 ppm Li, based on the total weight of the precipitate.

13. The method of claim 1, wherein the lithium compound comprises lithium hydroxide, lithium carbonate, lithium oxide, lithium oxalate, or a combination thereof.

14. The method of claim 1, wherein the cathode active material comprises Ni, Co, Mn, Al, or combination thereof in an amount corresponding to Formula 1:

$$Li_xMO_2,$$

wherein M is Ni, Co, Mn, Al, or a combination thereof and $0 \le x \le 1.4$.

15. The method of claim 1, wherein the cathode active material comprises Ni, Co, Mn, Al, or combination thereof in an amount corresponding to Formula 2:

$$Li_xNi_yCo_zMn_vO_2,$$

wherein $0 \le x \le 1.4$ and $0 \le (y+z+v) \le 1.1$.

16. The method of claim 1, wherein the cathode active material comprises Ni, Co, Mn, Al, or combination thereof in an amount corresponding to Formula 3:

$$mLi_2MnO_3 \cdot (1-m)LiMO_2$$

wherein

M is Ni, Co, Mn, Al, or a combination thereof; and $0 < m < 1$.

17. The method of claim 1, wherein the cathode active material comprises $0.33Li_2MnO_3 \cdot 0.66LiNi_{0.6}Co_{0.2}Mn_{0.2}O_2$.

18. The method of claim 1, further comprising combining the cathode active material with a virgin cathode active material.

* * * * *